US 11,774,134 B2

(12) United States Patent
Quinn et al.

(10) Patent No.: US 11,774,134 B2
(45) Date of Patent: Oct. 3, 2023

(54) FLEX DUCT FITTING SYSTEM AND DEVICE

(71) Applicant: AC PRO INC., Fontana, CA (US)

(72) Inventors: Dion Edward Quinn, Murrieta, CA (US); Daniel Passafonti, Huntington Beach, CA (US)

(73) Assignee: AC PRO INC., Fontana, CA (US)

( * ) Notice: Subject to any disclaimer, the term of this patent is extended or adjusted under 35 U.S.C. 154(b) by 675 days.

(21) Appl. No.: 16/724,324

(22) Filed: Dec. 22, 2019

(65) Prior Publication Data

US 2020/0217553 A1 Jul. 9, 2020

Related U.S. Application Data

(60) Provisional application No. 62/788,668, filed on Jan. 4, 2019.

(51) Int. Cl.
*F16L 23/04* (2006.01)
*F24F 13/02* (2006.01)
*F16L 23/08* (2006.01)

(52) U.S. Cl.
CPC .......... *F24F 13/0209* (2013.01); *F16L 23/04* (2013.01); *F16L 23/08* (2013.01)

(58) Field of Classification Search
CPC ......... F16L 33/03; F16L 33/035; F16L 33/08; F16L 33/04; F16L 33/10; F16L 33/28; F16L 41/021; F16L 41/023; F24F 13/0209; F24F 2007/002; F24F 13/0218; F24F 13/0236
See application file for complete search history.

(56) References Cited

U.S. PATENT DOCUMENTS

| | | | |
|---|---|---|---|
| 2,464,416 A * | 3/1949 | Raybould | F16L 33/224 |
| | | | 285/259 |
| 3,610,654 A | 10/1971 | Torres | |
| 3,687,168 A | 8/1972 | Sherman et al. | |
| 4,453,746 A * | 6/1984 | Keenan | F16L 33/2076 |
| | | | 285/256 |
| 4,648,628 A * | 3/1987 | Meadows | F16L 31/02 |
| | | | 285/133.11 |
| 6,193,285 B1 | 2/2001 | Proctor | |
| 6,425,608 B1 | 7/2002 | Nordström | |
| 8,371,619 B2 | 2/2013 | Boonstra | |
| 2006/0255590 A1 | 11/2006 | Ludeman | |

(Continued)

OTHER PUBLICATIONS

You Tube, EMT-7R Ogee Bead Rolls, Empire Machinery & Tools Ltd., https://www.youtube.com/watch?v=WP_pz8Ziue4, May 13, 2016, 1 page, USA.

*Primary Examiner* — Aaron M Dunwoody
(74) *Attorney, Agent, or Firm* — Olav M. Underdal; IDP Patent Services

(57) ABSTRACT

A flex duct fitting system includes: a flex duct with an inner lining, a flex duct fitting device, including a connector portion, including a connector portion body, a flex fitting assembly with a peripheral protrusion and a peripheral indentation; a circular fastener, such that the inner lining is pulled over the flex fitting assembly, such that the at least one circular fastener is positioned in the peripheral indentation and tightened around the connector portion body, with the inner lining tightened in place between the at least one circular fastener and the peripheral indentation.

15 Claims, 6 Drawing Sheets

(56) References Cited

U.S. PATENT DOCUMENTS

| | | | |
|---|---|---|---|
| 2010/0059985 A1* | 3/2010 | Nielson | A61M 39/12 |
| | | | 285/40 |
| 2014/0150917 A1 | 6/2014 | Army et al. | |
| 2016/0123511 A1 | 5/2016 | Khan et al. | |
| 2016/0265699 A1* | 9/2016 | Smith | F24F 13/0209 |
| 2017/0276276 A1 | 9/2017 | Clark | |
| 2019/0203972 A1 | 7/2019 | Moss | |

* cited by examiner

Flex Duct Fitting System

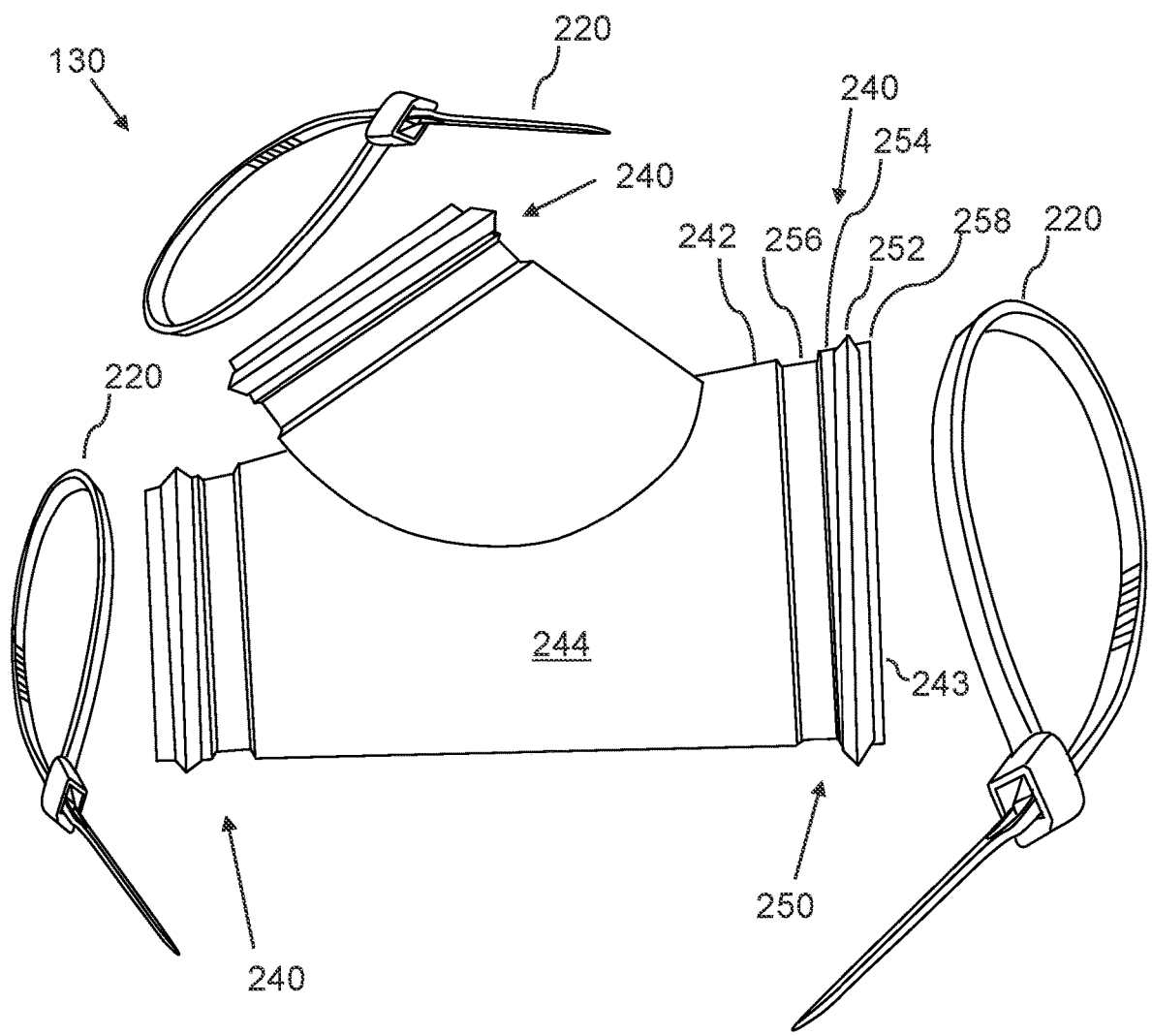

FLEX DUCT FITTING SYSTEM AND DEVICE

CROSS-REFERENCE TO RELATED APPLICATIONS

This application claims the benefit of U.S. Provisional Application No. 62/788,668, filed Jan. 4, 2019; which is hereby incorporated herein by reference in its entirety.

FIELD OF THE INVENTION

The present invention relates generally to the field of heating, ventilation, and air conditioning, and more particularly to methods and systems for flex duct installation in air conditioning systems.

BACKGROUND OF THE INVENTION

There are 3 common types of HVAC duct systems used in residential and commercial buildings: round duct, oval duct, and rectangular duct. These duct system specifications are defined in the HVAC Duct Construction Standards (ANSI/SMACNA 006-2006), published by SMACNA (Sheet Metal and Air Conditioning Contractors' National Association). A round duct system is comprised of several components and is most commonly used in residential installations. Relevant to this application are the sheet metal fittings and flex duct components of a round duct system.

In a round duct system, a flexible duct (called flex duct) is used in conjunction with several types of sheet metal fittings. Such round systems are commonly available in the marketplace.

The Flex duct is installed to the sheet metal fitting and fastened mechanically using zip ties. The current industry standard sheet metal fittings incorporate an external bead as a stop for the zip tie to ensure it can't be pulled off from the fitting.

There are several types of sheet metal fittings which use this type of external bead in their design for connection to a flex duct, which can include:
a) Boots, including cone boot, stack head boot, and straight boot;
b) Boxes, including ceiling box, cone perimeter box, floor box, stack head perimeter box, and return air can;
c) Collars, including duct board spin-in collar, flat starting collar, and super seal collar;
d) Flex coupling;
e) Sleeved dampers;
f) T-wye fittings and tri-wye fittings;
g) Saddle taps; and
h) Tapers and reducers.

However, the existing designs in the market of the single external bead have several shortcomings, including:
a) The single bead does not protrude substantially from the diameter of the fitting, such that it can be hard for the installer to ensure the zip is not crossing the bead during installation. If installed incorrectly, the air pressure within the system can blow the flex duct off the sheet metal fitting;
b) The sheet metal fittings are typically made from 26 gauge to 30 gauge galvanized steel, and are therefore fragile and easily damaged during transport; and
c) The single bead does not provide much mechanical holding strength for the zip tie, especially if the zip tie is not fully tightened.

As such, considering the foregoing, it may be appreciated that there continues to be a need for novel and improved devices and methods for flex duct installation.

SUMMARY OF THE INVENTION

The foregoing needs are met, to a great extent, by the present invention, wherein in aspects of this invention, enhancements are provided to the existing model of flex duct installation.

In an aspect, a flex duct fitting system can include:
a) a flex duct, which is an elongated hollow piece, which can include:
   an inner lining;
   an insulation layer; and
   an outer lining;
b) a flex duct fitting device, which can include:
   at least one connector portion, which can include:
      a connector portion body with a flow opening that provides access to an interior of the flex duct fitting device;
      a flex fitting assembly, including:
         a peripheral protrusion, which can be positioned around an outer surface of the connector portion body; and
         a peripheral indentation, which can be positioned around the outer surface, such that the peripheral indentation is located on an inner side relative to the peripheral protrusion, such that the peripheral protrusion is between the peripheral indentation and an outer periphery of the connector portion body; and
c) at least one circular fastener, such that the at least one circular fastener can be configured to match the peripheral indentation, such that the at least one circular fastener is positioned in the peripheral indentation and tightened around the connector portion body;
wherein the inner lining can be pulled over the flex fitting assembly, such that the at least one circular fastener is positioned in the peripheral indentation and tightened around the connector portion body, with the inner lining tightened in place between the at least one circular fastener and the peripheral indentation.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the

BRIEF DESCRIPTION OF THE DRAWINGS

FIG. 2A is a side view of a flex duct fitting device, according to an embodiment of the invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

All documents mentioned in this disclosure are incorporated herein by reference to the same extent as if each individual document was specifically and individually indicated to be incorporated herein by reference.

It shall be noted that throughout the disclosure, where a definition or use of a term in any incorporated document(s) is inconsistent or contrary to the definition of that term provided herein, the definition of that term provided herein applies and the definition of that term in the incorporated document(s) does not apply.

Figure 1:
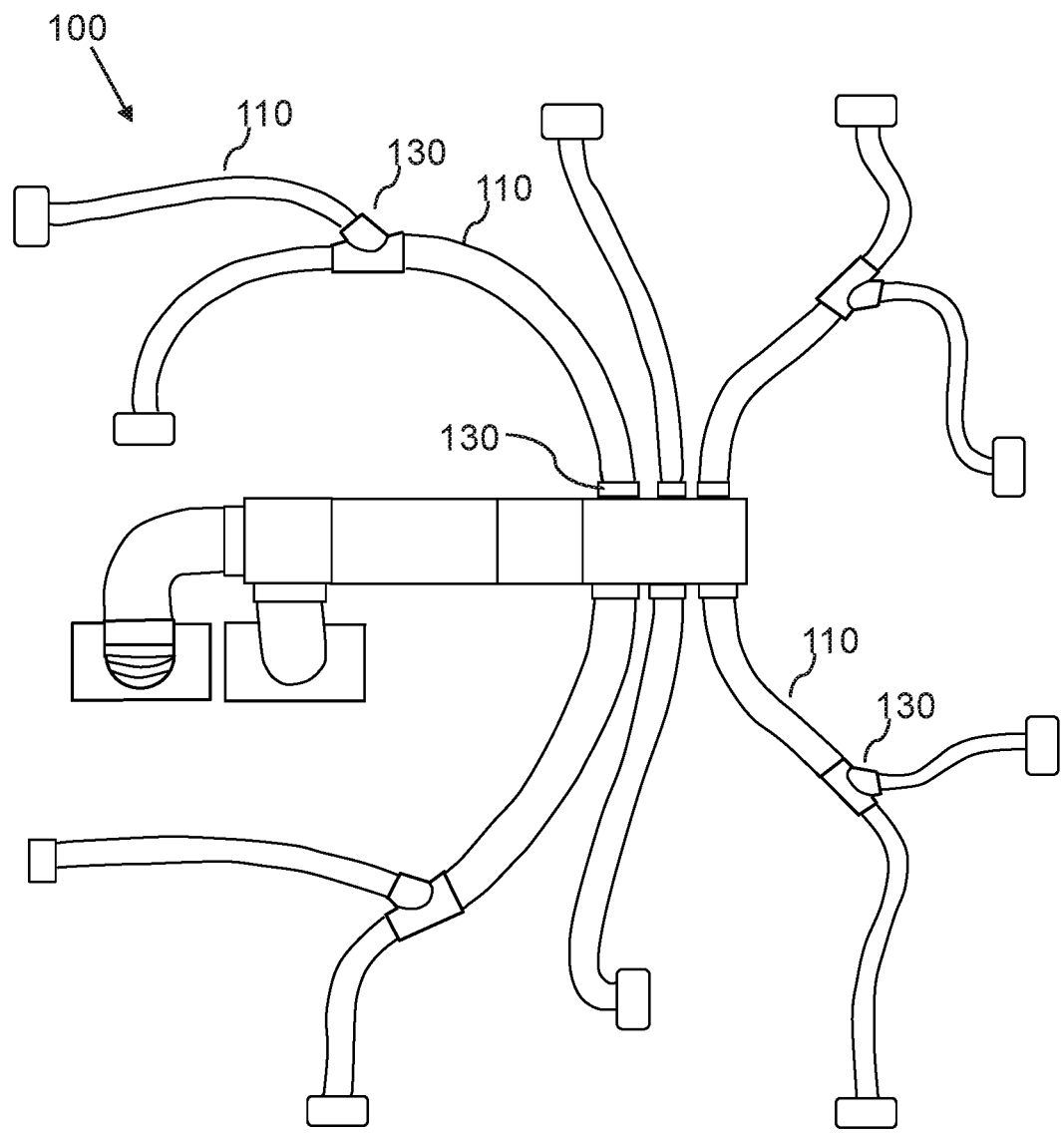
FIG. 1 is a schematic diagram illustrating a flex duct fitting system, according to an embodiment of the invention.
Figure 2B:
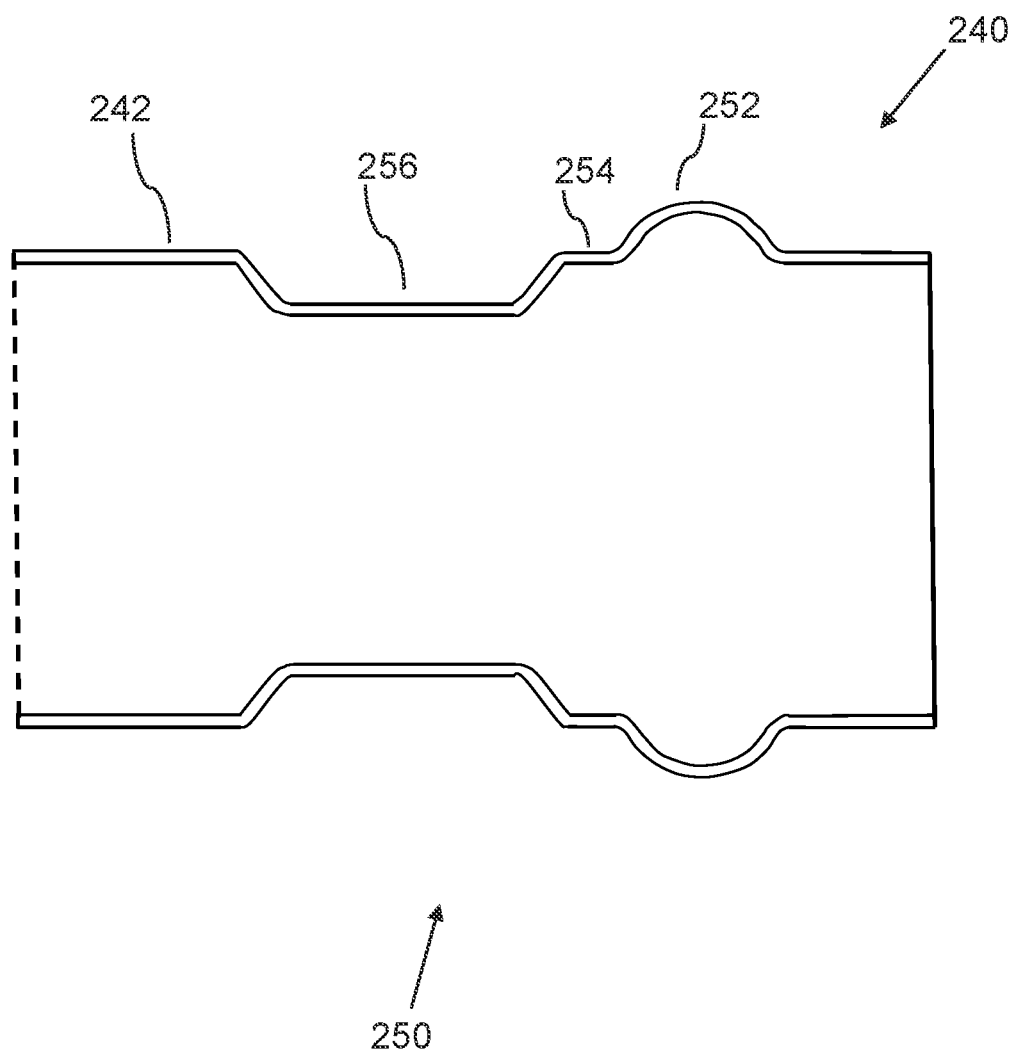
FIG. 2B is a side cross-sectional view of a flex duct fitting device, according to an embodiment of the invention.

In the following, we describe the structure of an embodiment of a flex duct fitting system 100 with reference to FIG. 1, in such manner that like reference numerals refer to like components throughout; a convention that we shall employ for the remainder of this specification.

Figure 3A:
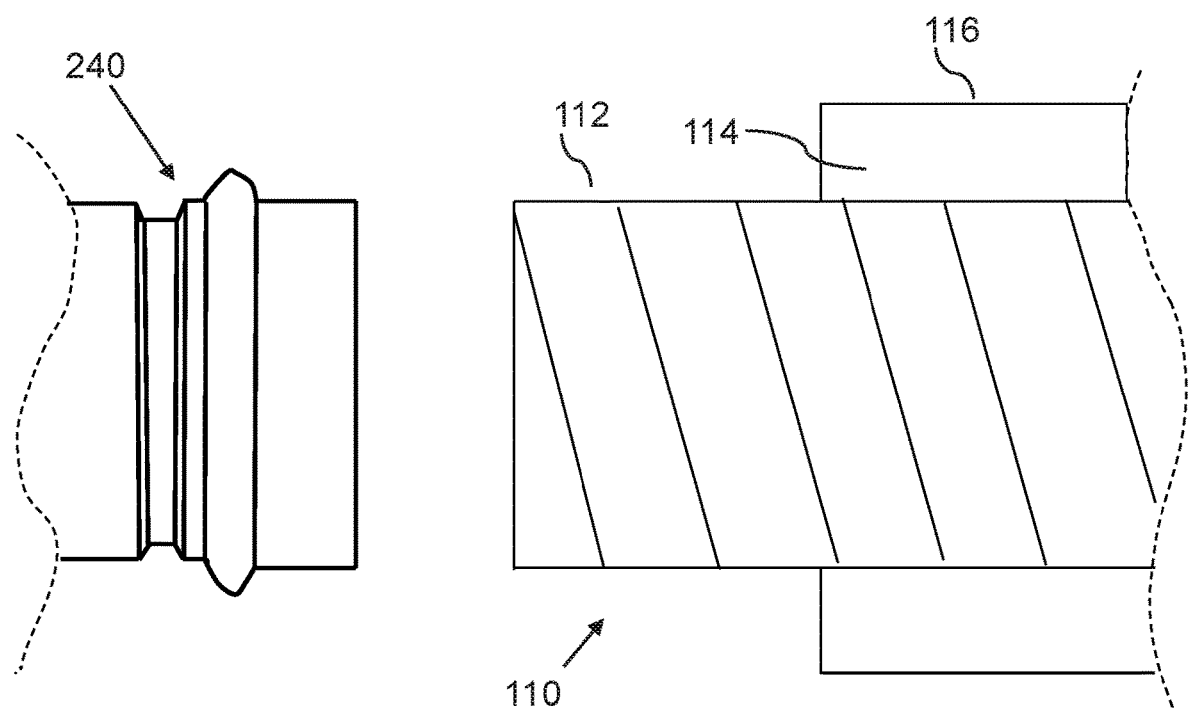
FIG. 3A is a side view of a flex duct fitting device and a flex duct prior to being connected, according to an embodiment of the invention.
Figure 3B:
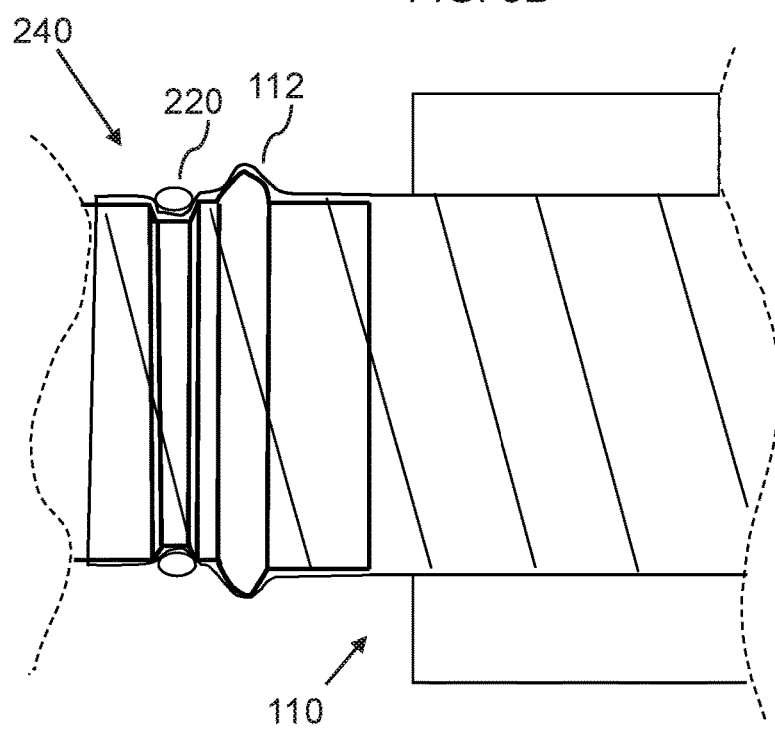
FIG. 3B is a side view of a flex duct fitting device and a flex duct after being connected, according to an embodiment of the invention.

In an embodiment, as shown in FIGS. 1, 2A, 2B, 3A, 3B, and 4F, a flex duct fitting system 100 for use in air conditioning installation can include:

a) a flex duct 110, which is an elongated hollow piece, which comprises:
  i. an inner lining 112;
  ii. an insulation layer 114; and
  iii. an outer lining 116;
b) a flex duct fitting device 130, which comprises:
  i. at least one connector portion 240, which comprises:
    a connector portion body 242 with a flow opening 243 that provides access to an interior 244 of the flex duct fitting device 130; and
    a flex fitting assembly 250, comprising:
      a peripheral protrusion 252, which is positioned around an outer surface of the connector portion body 242;
      a peripheral indentation 256, which is positioned around the outer surface, such that the peripheral indentation is located on an inner side relative to the peripheral protrusion 252, such that the peripheral protrusion 252 is between the peripheral indentation 256 and an outer periphery 258 of the connector portion body 242; and
      an intermediate portion 254 of the outer surface of the connector portion body 242, such that the intermediate portion 254 is positioned between the peripheral protrusion 252 and the peripheral indentation 256, such that the peripheral indentation 256 is indented relative to the intermediate portion 254, and such that the peripheral protrusion 252 protrudes relative to the intermediate portion 254; and
c) at least one circular fastener 220, which can be a band fastener 220, which for example can be a zip band fastener 220 (zip tie) or a screw band clamp 220, such that the at least one circular fastener 220 is configured to match (fit into the a peripheral indentation 256 such that the at least one circular fastener 220 can be positioned in the peripheral indentation 256 and tightened around the connector portion body 242;
wherein, as shown in FIGS. 3A and 3B, the inner lining 112 can be pulled over the flex fitting assembly 250 (i.e. such that the flex fitting assembly 250 is configured to allow the inner lining 112 to be pulled over the flex fitting assembly 250), such that the at least one circular fastener 220 is positioned in the peripheral indentation 256 and tightened around the connector portion body 242, with the inner lining 112 tightened in place between the at least one circular fastener 220 and the peripheral indentation 256, such that an airtight connection is formed between the an inner lining 112 and the at least one connector portion 240.

In a related embodiment, the peripheral protrusion 252 can be a protruding band 252, which is mounted on an outer side of the connector portion body 242, or alternatively a protruding molding of the connector portion body 242.

In a related embodiment, the peripheral protrusion 252 can be a protruding beading 252 of the connector portion body 242, such that the protruding beading 252 can be formed in a sheet metal of the connector portion body 242.

In a related embodiment, the peripheral indentation 256 can be a band, which comprises the indentation, which is mounted on an outer side of the connector portion body 242, around a periphery of the connector portion body 242, or alternatively the peripheral indentation 256 can be carved or molded in a surface of the connector portion body 242.

In a related embodiment, the peripheral indentation 256 can be a beaded indentation of the connector portion body 242, such that the peripheral indentation 256 can be formed in a sheet metal of the connector portion body 242.

In another related embodiment, the circular fastener 220 can be a duct tape segment 220, which is wound around the connector portion body 242 and the inner lining 112. Alternatively, duct tape may be used on top of an installed and tightened flex duct fitting device 130 that is connected to an inner lining 112 of a flex duct 110 with a circular fastener 220.

Figure 4A:
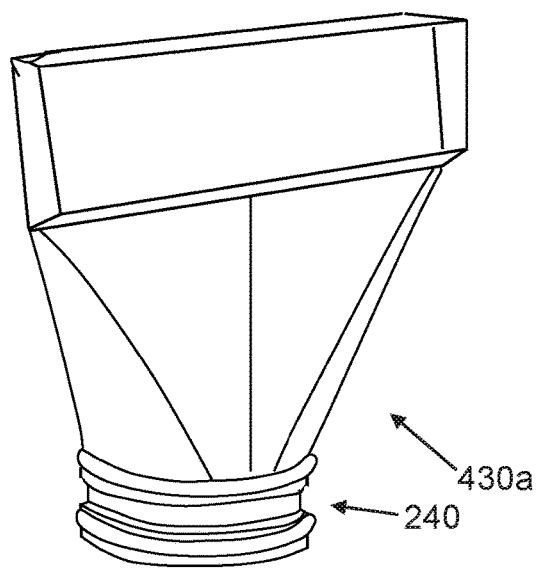
FIG. 4A is a perspective view of a stack head boot flex duct fitting device, according to an embodiment of the invention.
Figure 4B:
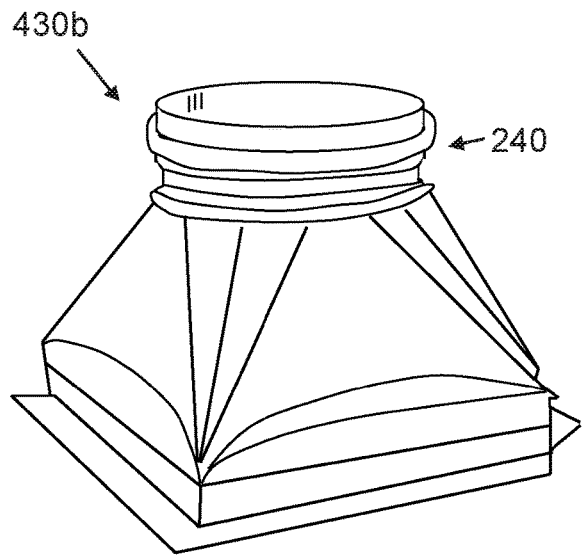
FIG. 4B is a perspective view of a ceiling box flex duct fitting device, according to an embodiment of the invention.
Figure 4C:
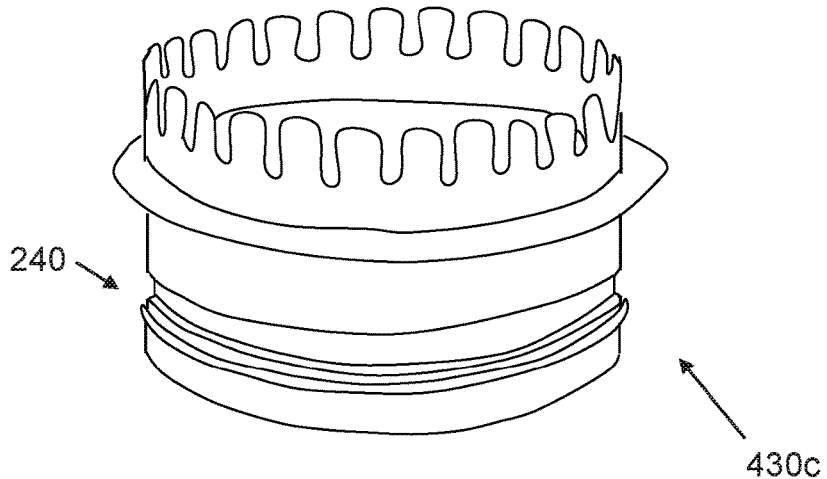
FIG. 4C is a perspective view of a duct board starting collar duct fitting device, according to an embodiment of the invention.
Figure 4D:
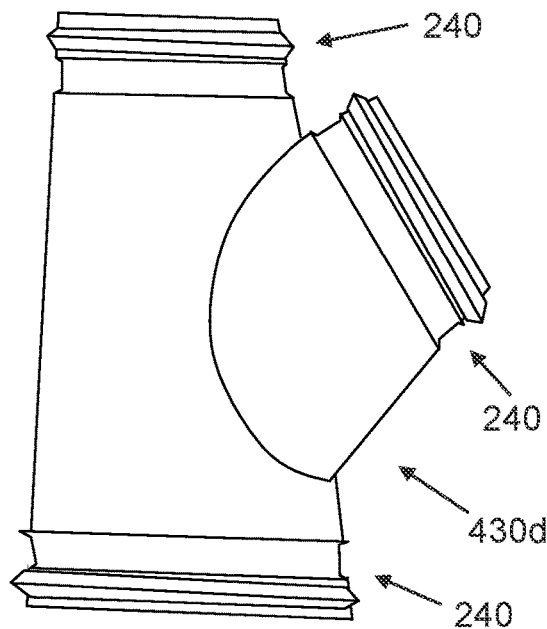
FIG. 4D is a perspective view of a T-wye flex duct fitting device, according to an embodiment of the invention.
Figure 4E:
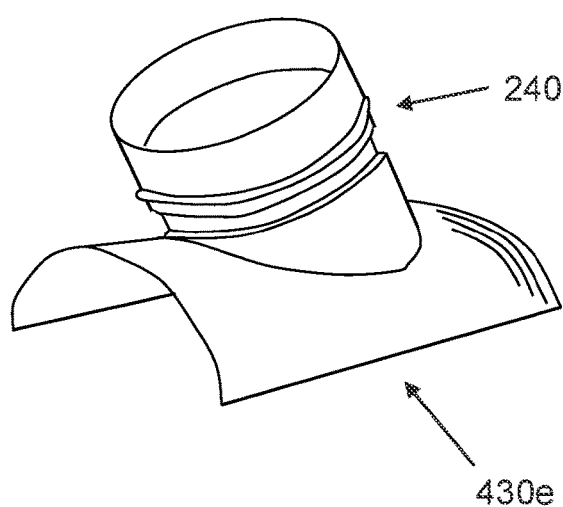
FIG. 4E is a perspective view of a saddle tap flex duct fitting device, according to an embodiment of the invention.
Figure 4F:
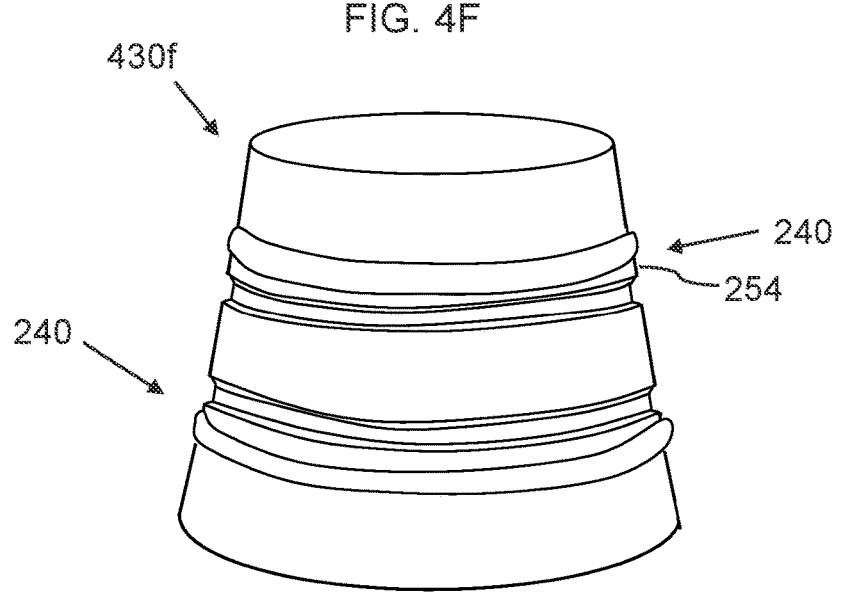
FIG. 4F is a perspective view of a taper flex duct fitting device, according to an embodiment of the invention.

In related example embodiments, as shown in FIGS. 4A-4F, the flex duct fitting device 130 can for example include configurations as:
- a) a stack head boot flex duct fitting device 430a, as shown in FIG. 4A, which comprises a single connector portion 240;
- b) a ceiling box flex duct fitting device 430b, as shown in FIG. 4B, which comprises a single connector portion 240;
- c) a duct board starting collar flex duct fitting device 430c, as shown in FIG. 4C, which comprises a single connector portion 240;
- d) a T-wye flex duct fitting device 430d, as shown in FIG. 4D, which includes three connector portions 240;
- e) a saddle tap flex duct fitting device 430e, as shown in FIG. 4E, which includes a single connector portion 240;
- f) a taper flex duct fitting device 430f, as shown in FIG. 4F, which includes two connector portions 240; or
- g) or other types of flex duct fitting devices, which include at least one connector portion 240.

In other related example embodiments, various configurations of the flex duct fitting device 130, each including at least one connector portion 240, can include:
- a) Boots 130, including cone boot, stack head boot, and straight boot;
- b) Boxes 130, including ceiling box, cone perimeter box, floor box, stack head perimeter box, and return air can;
- c) Collars 130, including duct board spin-in collar, flat starting collar, and super seal collar;
- d) Flex coupling 130;
- e) Sleeved dampers 130;
- f) T-wye fittings 130 and tri-wye fittings 130;
- g) Saddle taps 130; and
- h) Tapers 130 and reducers 130.

Thus, the flex duct fitting system 100 is superior to the existing methods and systems in use for flex duct fitting, at least in the following ways:
- a) Improved holding strength of the zip tie;
- b) Stronger duct shape makes the assembly extremely rigid and hard to deform/damage ends during handling, transportation and assembly; and
- c) Easier installation because it's easier to seat the zip tie in the trough/peripheral indentation 256.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. Such variations and alternate embodiments are contemplated and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

Here has thus been described a multitude of embodiments of the flex duct fitting system 100, the flex duct fitting device 130, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A flex duct fitting system, comprising:
- a) a flex duct, which is an elongated hollow piece, which comprises:
  an inner lining;
- b) a flex duct fitting device, comprising:
  at least one connector portion, comprising:
    a connector portion body comprising a flow opening that provides access to an interior of the flex duct fitting device; and
    a flex fitting assembly, comprising:
      a peripheral protrusion, which is positioned around an outer surface of the connector portion body;
      a peripheral indentation, which is positioned around the outer surface, such that the peripheral indentation is located on an inner side relative to the peripheral protrusion, such that the peripheral protrusion is between the peripheral indentation and an outer periphery of the connector portion body; and an intermediate portion of the outer surface of the connector portion body, such that the intermediate portion is positioned between the peripheral protrusion and the peripheral indentation, such that the peripheral indentation is indented relative to the intermediate portion, and such that the peripheral protrusion protrudes relative to the intermediate portion; and c) at least one circular fastener, such that the at least one circular fastener is configured to match the peripheral indentation, such that the at least one circular fastener is positioned in the peripheral indentation and tightened around the connector portion body;

wherein the at least one fastener is selected from the group consisting of a circular zip band fastener and a circular screw band clamp;

wherein the inner lining is pulled over the flex fitting assembly, such that the at least one circular fastener is positioned in the peripheral indentation and tightened around the connector portion body, with the inner lining tightened in place between the at least one circular fastener and the peripheral indentation.

2. The flex duct fitting system of claim 1, wherein the peripheral protrusion is a protruding beading of the connector portion body.

3. The flex duct fitting system of claim 1, wherein the peripheral indentation is a beaded indentation of the connector portion body.

4. The flex duct fitting system of claim 1, wherein the at least one connector portion is a single connector portion.

5. The flex duct fitting system of claim 1, wherein the at least one connector portion is two connector portions.

6. The flex duct fitting system of claim 1, wherein the at least one connector portion is three connector portions.

7. A flex duct fitting system, comprising:
a) a flex duct fitting device, comprising:
at least one connector portion, comprising:
a connector portion body comprising a flow opening that provides access to an interior of the flex duct fitting device; and
a flex fitting assembly, comprising:
a peripheral protrusion, which is positioned around an outer surface of the connector portion body;
a peripheral indentation, which is positioned around the outer surface, such that the peripheral indentation is located on an inner side relative to the peripheral protrusion, such that the peripheral protrusion is between the peripheral indentation and an outer periphery of the connector portion body; and
an intermediate portion of the outer surface of the connector portion body, such that the intermediate portion is positioned between the peripheral protrusion and the peripheral indentation, such that the peripheral indentation is indented relative to the intermediate portion, and such that the peripheral protrusion protrudes relative to the intermediate portion; and
b) at least one fastener, such that the at least one fastener is configured to match the peripheral indentation, such that the at least one fastener is configured to be positioned in the peripheral indentation and tightened around the connector portion body;

wherein the at least one fastener is selected from the group consisting of a circular zip band fastener and a circular screw band clamp;

wherein the flex fitting assembly is configured to allow an inner lining of a flex duct to be pulled over the flex fitting assembly, such that the at least one fastener is configured to be positioned in the peripheral indentation and tightened around the connector portion body, with the inner lining tightened in place between the at least one fastener and the peripheral indentation.

8. The flex duct fitting system of claim 7, wherein the peripheral protrusion is a protruding beading of the connector portion body.

9. The flex duct fitting system of claim 7, wherein the peripheral indentation is a beaded indentation of the connector portion body.

10. The flex duct fitting system of claim 7, wherein the at least one connector portion is a single connector portion.

11. The flex duct fitting system of claim 7, wherein the at least one connector portion is two connector portions.

12. The flex duct fitting system of claim 7, wherein the at least one connector portion is three connector portions.

13. A flex duct fitting system, comprising:
a) a flex duct fitting device, comprising:
at least one connector portion, comprising:
a connector portion body; and
a flex fitting assembly, comprising:
a peripheral protrusion, which is positioned around an outer surface of the connector portion body;
a peripheral indentation, which is positioned around the outer surface, such that the peripheral indentation is located on an inner side relative to the peripheral protrusion, such that the peripheral protrusion is between the peripheral indentation and an outer periphery of the connector portion body; and
an intermediate portion of the outer surface of the connector portion body, such that the intermediate portion is positioned between the peripheral protrusion and the peripheral indentation, such that the peripheral indentation is indented relative to the intermediate portion, and such that the peripheral protrusion protrudes relative to the intermediate portion; and
b) at least one fastener, such that the at least one fastener is configured to match the peripheral indentation, such that the at least one fastener is configured to be positioned in the peripheral indentation and tightened around the connector portion body;

wherein the at least one fastener is selected from the group consisting of a circular zip band fastener and a circular screw band clamp;

wherein the flex fitting assembly is configured to allow an inner lining of a flex duct to be pulled over the flex fitting assembly, such that the at least one fastener is configured to be positioned in the peripheral indentation and tightened around the connector portion body, with the inner lining tightened in place between the at least one fastener and the peripheral indentation.

14. The flex duct fitting system of claim 13, wherein the peripheral protrusion is a protruding beading of the connector portion body.

15. The flex duct fitting system of claim 13, wherein the peripheral indentation is a beaded indentation of the connector portion body.

* * * * *